United States Patent
Pandey (10) Patent No.: US 12,289,139 B2
(45) Date of Patent: Apr. 29, 2025

(54) POWER LINE DATA TRANSCEIVER

(71) Applicant: Shenzhen Yinwang Intelligent Technologies Co., Ltd., Shenzhen (CN)

(72) Inventor: Sujan Pandey, Leuven (BE)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/449,504

(22) Filed: Aug. 14, 2023

(65) Prior Publication Data
US 2023/0387964 A1  Nov. 30, 2023

Related U.S. Application Data

(63) Continuation of application No. PCT/EP2021/053421, filed on Feb. 12, 2021.

(51) Int. Cl.
*H04B 3/48* (2015.01)
*H04B 3/54* (2006.01)
*H04L 12/10* (2006.01)

(52) U.S. Cl.
CPC ............... *H04B 3/54* (2013.01); *H04B 3/48* (2013.01); *H04L 12/10* (2013.01)

(58) Field of Classification Search
CPC .............. H04B 3/54; H04B 3/48; H04L 12/10
See application file for complete search history.

(56) References Cited

U.S. PATENT DOCUMENTS

2019/0068385 A1* 2/2019 Gardner ................... H02J 1/10

* cited by examiner

*Primary Examiner* — Rahel Guarino
(74) *Attorney, Agent, or Firm* — Leydig, Voit & Mayer, Ltd.

(57) ABSTRACT

A power line data transceiver is for transmitting or receiving data over a power line. The power line is adapted to distribute electric power. The power line transmitter has a data transceiver coupled to the at least two wires of the shielded cable via a capacitive coupling network. The data transceiver is configured to transmit or receive a data signal over the at least two wires of the shielded cable. A power supply is coupled to the shielded cable over an inductive coupling network. The power supply is configured to inject a feeding current on the at least two wires of the shielded cable for feeding the electric load with electric power, and to receive a return current from the electric load over the conductive shield of the shielded cable.

15 Claims, 5 Drawing Sheets

POWER LINE DATA TRANSCEIVER

CROSS-REFERENCE TO RELATED APPLICATIONS

This application is a continuation of International Application No. PCT/EP2021/053421, filed on Feb. 12, 2021, the disclosure of which is hereby incorporated by reference in its entirety.

FIELD

The present disclosure relates to power line data transceivers and methods for transmitting or receiving data over a power line, including a power line comprising a shielded cable including at least two wires and a conductive shield shielding the at least two wires. The disclosure relates to techniques for automotive PoDL (power over data line) power delivery boosting through STP (shielded twisted pair) cable with improved EMC (electromagnetic compatibility).

BACKGROUND

Figure 1:
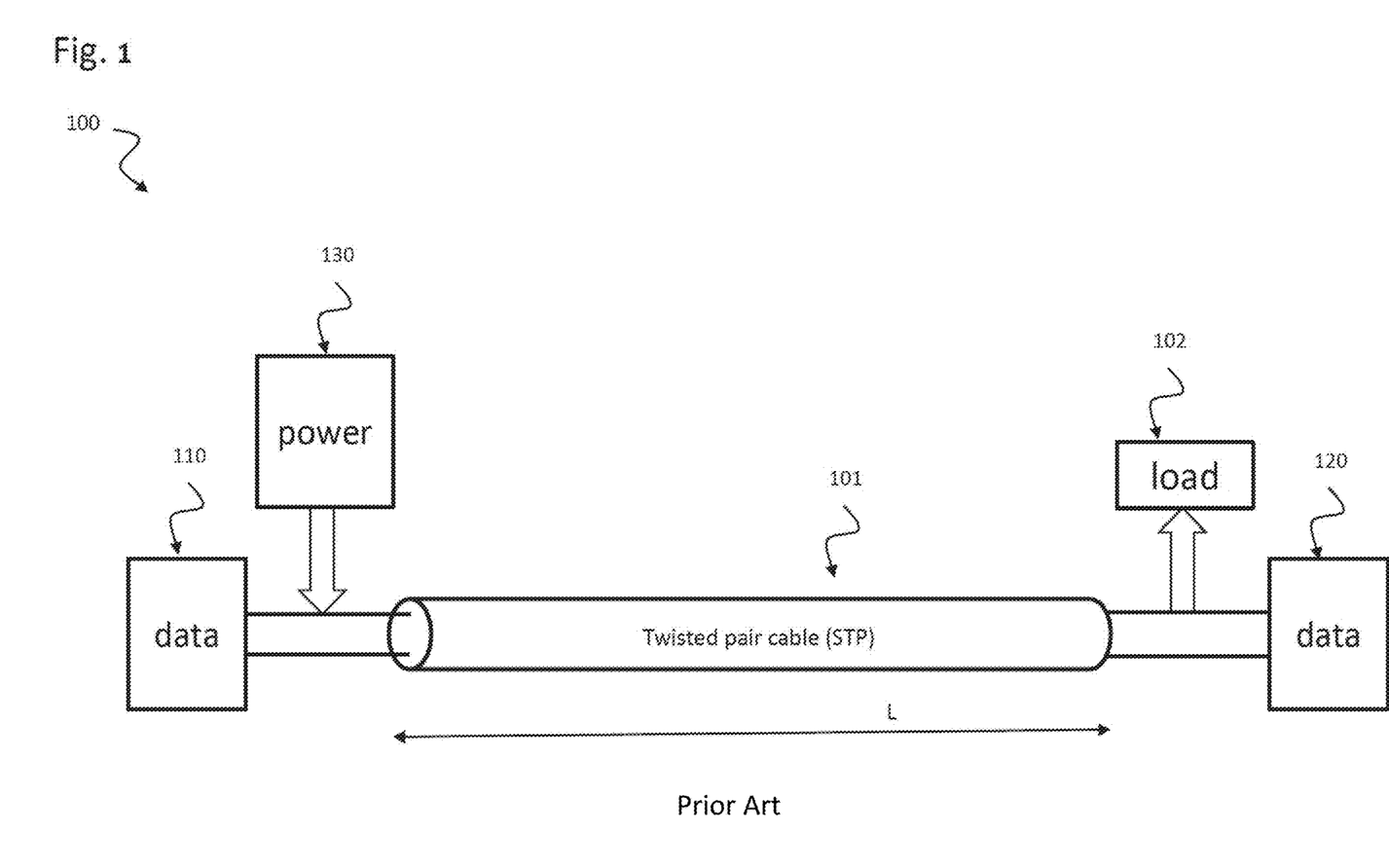
FIG. 1 shows a schematic diagram of a power over data line (PoDL) system according to the PoDL standard.

FIG. 1 shows a power over data line system 100 according to the power over data line (PoDL) standard that was defined in the IEEE 802.3bu task force, in particular for automotive applications. This PoDL system 100 enables feeding power 130 to load 102 using a single twisted pair data line cable 101. In this PoDL system 100, one wire is used for forward current to the load 102, and the other wire is used for return current. Data is transmitted over the twisted pair cable 101 between two data entities 110, 120.

The main limitation of such a PoDL system 100 is the amount of power delivery to the load 102 because it is limited by several factors, such as DC resistance of cable 101, DC resistance of power inductors, etc. As the cable length L increases, DC resistance also increases causing higher voltage drop on the cable 101, and resulting in delivery of only a small amount of power to the load 102. An option to increase the power to the load is to increase the voltage at the power feeding side 130, but there are several constraints such as: Increasing the voltage requires higher ESD protection circuitry and some technology may not easily allow using a higher voltage. There may be the need for another sophisticated voltage regulator at the load side, which increases the cost. Another option is to use the vehicle body as a return path in order to deliver more power to the load, however, this may not be effective because for many automotive use cases, due to EMC reason, the vehicle body is isolated with respect to DC signal. In the future, the vehicle body may include more and more plastic material that has a high resistance to current. Another factor, especially for automotive use cases, is that the in-vehicle network is usually decoupled from vehicle body due to EMC reasons.

SUMMARY

Aspects of the present disclosure provide a power line data transceiver and a method for power line data transmission which are able to provide an increased amount of power to the load over a power line without suffering from the above described problems.

Aspects of the present disclosure provide an efficient power line data transceiver with low voltage drop, low losses and improved electromagnetic compatibility.

Figure 2:
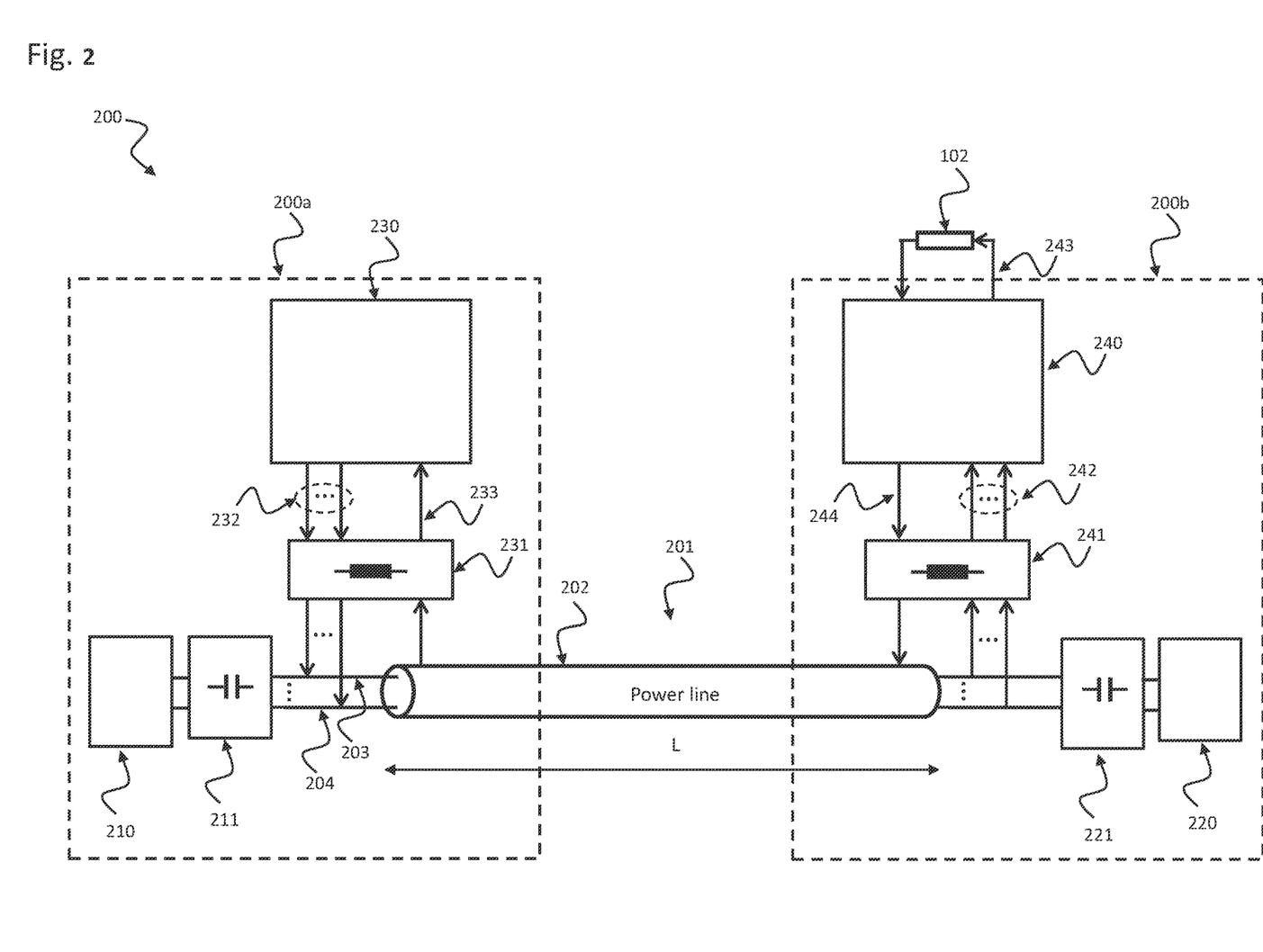
FIG. 2 shows a schematic diagram of power over data line technology according to the disclosure.
Figure 3:
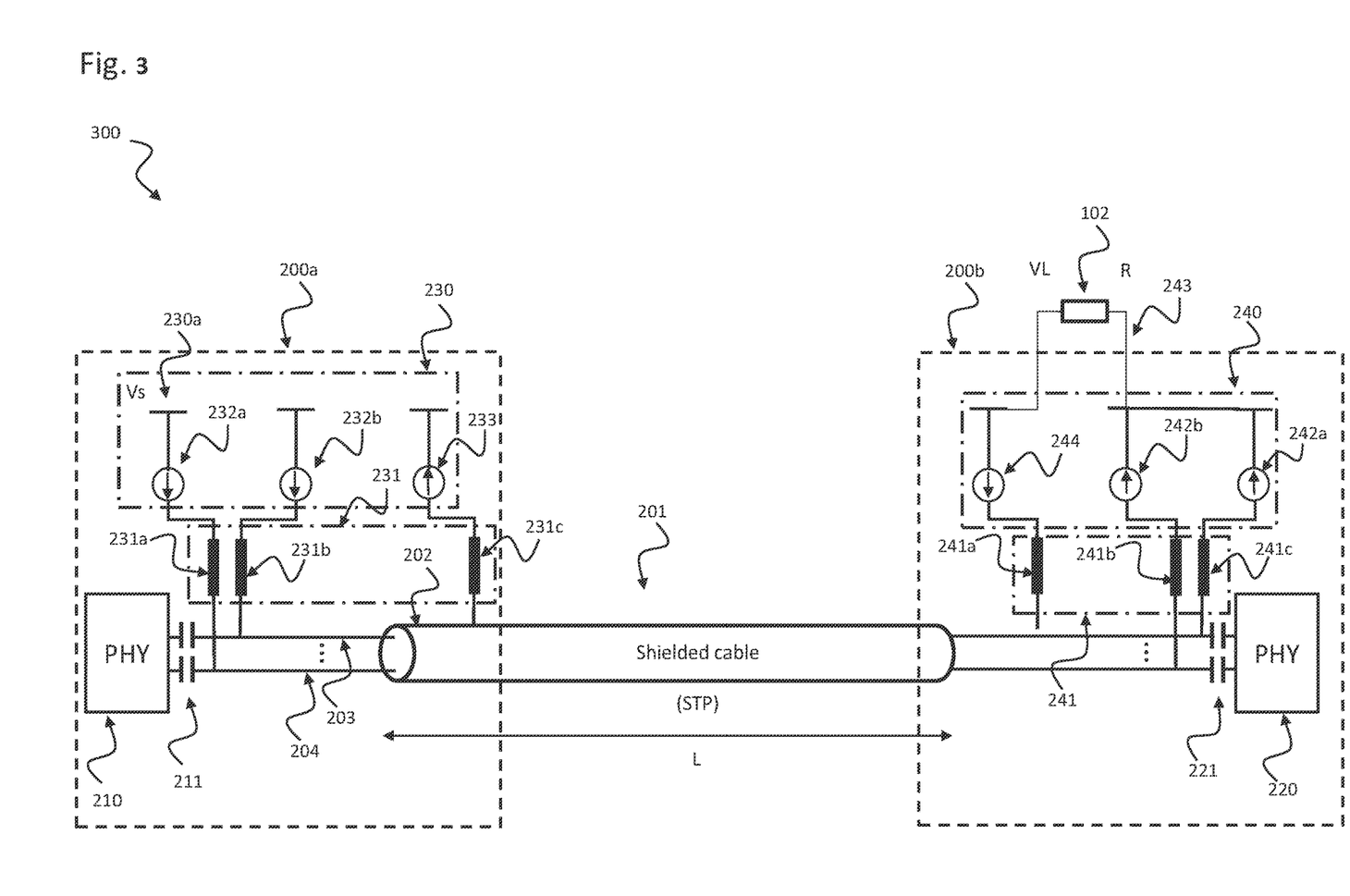
FIG. 3 shows a schematic diagram of an exemplary Power over Data Line technology according to the disclosure.

A basic idea of an aspect of the present disclosure is to use the shield of a twisted pair cable as current return path, and to boost the power delivery by injecting forward current to both wires of twisted pair cable. This is enabled by adding one more pair of inductors that are connected to the shield at the power supply and load ends as shown in FIGS. 2 and 3. By using two wires for feeding current, it is possible to inject $2 \times I_{DC}$ current to the load, and total power delivery can be doubled by using the shield as a return path. If the voltage is kept the same at the load, then the total delivered power can be increased by a factor of 4.

This idea provides the following benefits: Power delivery to load can be increased by a minimum of factor 2 and a maximum of factor 4. By using additional inductors to shield, EMC can be improved. There is no need to overdrive the wire with DC current, resulting in low voltage drop and losses. The idea provides a power efficient and green (environmentally friendly) solution.

The basic idea can be generalized to using a multi-wired shielded cable, where forward current is injected to the multiple wires of the shielded cable and the shield is used as current return path.

The concept described in this disclosure can be applied in automotive applications using shielded cable. As there is a need of more and more bandwidth for the future autonomous vehicle to reliably transmit sensors data to the central processing unit, shielded cable are the most chosen medium by the existing and future standards such as 1000BASE-T1, 10GBASE-T1, and future 25GBASE-T1. These technologies use shielded cable to meet EMC requirements.

The technology described in this disclosure can be used as a standard using shield cable for PoDL and complementing shield for delivering more power within IEEE 802.3.

Apart from automotive, the technology described herein can also be applied in industrial and automation applications.

In Order to Describe the Present Disclosure in Detail, the Following Terms, Abbreviations and Notations Will be Used:

PoDL Power over Data Line
PHY Physical layer device
EMC Electromagnetic compatibility
ESD Electrostatic sensitive device
DC Direct Current
STP Shielded Twisted Pair According to a first aspect, the disclosure relates to a power line data transceiver for transmitting or receiving data over a power line, the power line being adapted to distribute electric power, wherein the power line comprises a shielded cable including at least two wires and a conductive shield shielding the at least two wires, and wherein an electric load is coupled to the power line, the power line data transceiver comprising: a data transceiver coupled to the at least two wires of the shielded cable via a capacitive coupling network, wherein the data transceiver is configured to transmit or receive a data signal over the at least two wires of the shielded cable; and a power supply coupled to the shielded cable over an inductive coupling network, wherein the power supply is configured to inject a feeding current on the at least two wires of the shielded cable for feeding the electric load with electric power, and to receive a return current from the electric load over the conductive shield of the shielded cable.

Such a power line data transceiver enables low voltage drop and low losses along the cable and provides improved electromagnetic compatibility. By using the shield of a cable as current return path power delivery can be boosted by injecting forward current to both or multiple wires of the cable. For example, by using two wires for feeding current, it is possible to inject $2\times I_{DC}$ current to the load and total power delivery can be doubled by using the shield as return path. There is no need to overdrive the wire with DC current, resulting in low voltage drop and losses. The power line data transceiver provides a power efficient and green, i.e. environmentally friendly solution.

In an exemplary implementation of the power line data transceiver, the inductive coupling network comprises: at least two power inductors coupling the power supply with the at least two wires of the shielded cable, the at least two power inductors enabling the injection of the feeding current on the at least two wires of the shielded cable.

By using such inductive coupling network, power can be efficiently coupled to the line at low losses and high efficiency. EMC can be improved by using such inductive coupling network.

In an exemplary implementation of the power line data transceiver, the inductive coupling network comprises: a further power inductor coupling the power supply with the conductive shield of the shielded cable, the further power inductor enabling the reception of the return current from the electric load over the conductive shield of the shielded cable.

By using such inductive coupling network with further power inductor, power can be efficiently decoupled from the line at low losses and high efficiency. EMC can be improved by using such additional power inductor.

In an exemplary implementation of the power line data transceiver, the at least two power inductors are configured to block the data signal from the power supply.

This provides the advantage that the power inductors efficiently block the data signal from the power supply resulting in a significant lower data transmission error rate.

In an exemplary implementation of the power line data transceiver, the power supply comprises, for each of the at least two wires of the shielded cable, a respective current source, wherein the feeding current injected on the at least two wires of the shielded cable corresponds to a sum of the respective current sources.

This provides the advantage that the feeding current injected on the wires can be increased by at least a factor of two.

In an exemplary implementation of the power line data transceiver, the power line comprises a shielded twisted pair cable.

This provides the advantage that for a shielded twisted pair cable, power delivery to load can be increased by a minimum of factor 2 and a maximum of factor 4.

In an exemplary implementation of the power line data transceiver, the power line comprises an Ethernet cable, in particular an automotive Ethernet cable.

Such a power line data transceiver can be advantageously applied in automotive applications, for example in autonomous vehicle to reliably transmit sensor data to the central processing unit using shielded cable as defined in standards such as 1000BASE-T1, 10GBASE-T1, and future 25GBASE-T1.

Such a power line data transceiver can be used as a standard using shield cable for PoDL and complementing shield for delivering more power within IEEE 802.3.

Apart from automotive, the power line data transceiver can also be applied in industrial and automation applications.

According to a second aspect, the disclosure relates to a power line data transceiver for receiving or transmitting data over a power line, the power line being adapted to distribute electric power, wherein the power line comprises a shielded cable including at least two wires and a conductive shield shielding the at least two wires, and wherein an electric load is coupled to the power line, the power line transceiver comprising: a data transceiver coupled to the at least two wires of the shielded cable via a capacitive coupling network, wherein the data transceiver is configured to receive or transmit a data signal over the at least two wires of the shielded cable; and a power transceiver coupled to the shielded cable over an inductive coupling network, wherein the power transceiver is configured to receive a feeding current over the at least two wires of the shielded cable for feeding the electric load with electric power, and to inject a return current from the electric load on the conductive shield of the shielded cable.

Such a power line data transceiver enables low voltage drop and low losses along the cable and provides improved electromagnetic compatibility. Power delivery can be boosted by receiving forward current from both or multiple wires of the cable. By using the shield of the cable as a current return path, return current can be efficiently injected on the shield of the cable. For example, by using two wires for feeding current, it is possible to receive $2\times I_{DC}$ current (i.e. two times the DC current) for the load and total power delivery can be doubled by injecting the return current on the shield. There is no need to overdrive the wire with DC current, resulting in low voltage drop and losses. The power line data transceiver provides a power efficient and green, i.e. environmentally friendly solution.

In an exemplary implementation of the power line data transceiver, the inductive coupling network comprises: at least two power inductors coupling the power transceiver with the at least two wires of the shielded cable, the at least two power inductors enabling the reception of the feeding current from the at least two wires of the shielded cable.

By using such inductive coupling network, power can be efficiently decoupled from the line at low losses and high efficiency. EMC can be improved by using such inductive coupling network.

In an exemplary implementation of the power line data transceiver, the inductive coupling network comprises: a further power inductor coupling the power transceiver with the conductive shield of the shielded cable, the further power inductor enabling the injection of the return current from the electric load on the conductive shield of the shielded cable.

By using such inductive coupling network with further power inductor, power can be efficiently coupled to the line at low losses and high efficiency. EMC can be improved by using such additional power inductor.

In an exemplary implementation of the power line data transceiver, the at least two power inductors are configured to block the data signal from the power transceiver and the electric load.

This provides the advantage that the power inductors efficiently block the data signal from the power transceiver and the electric load resulting in a significant lower data transmission error rate.

In an exemplary implementation of the power line data transceiver, the feeding current delivered to the electric load corresponds to a sum of currents carried by the respective wires of the at least two wires of the shielded cable.

This provides the advantage that the feeding current received from the wires can be increased by at least a factor of two.

In an exemplary implementation of the power line data transceiver, the shielded cable comprises a number of m wires; the electric load has an electric resistance of $R_L$; and the power transceiver is configured to receive on each wire a partial feeding current $I_{DC}$, resulting in a feeding of the electric load with an electric power of approximately: (m $I_{DC})^2 R_L$.

This provides the advantage that the total feeding current can be increased by a factor of m according to the number of wires and the delivered power is correspondingly increased.

In an exemplary implementation of the power line data transceiver, the data line comprises a shielded twisted pair cable.

This provides the advantage that for a shielded twisted pair cable, power delivery to load can be increased by a minimum of factor 2 and a maximum of factor 4.

In an exemplary implementation of the power line data transceiver, the data line comprises an Ethernet cable, in particular an automotive Ethernet cable.

Such a power line data transceiver can be advantageously applied in automotive applications, for example in autonomous vehicle to reliably transmit sensor data to the central processing unit using shielded cable as defined in standards such as 1000BASE-T1, 10GBASE-T1, and future 25GBASE-T1.

Such a power line data transceiver can be used as a standard using shield cable for PoDL and complementing shield for delivering more power within IEEE 802.3.

Apart from automotive, the power line data transceiver can also be applied in industrial and automation applications.

According to a third aspect, the disclosure relates to a method for transmitting or receiving data over a power line, the power line being adapted to distribute electric power, wherein the power line comprises a shielded cable including at least two wires and a conductive shield shielding the at least two wires, and wherein an electric load is coupled to the power line, the method comprising: transmitting or receiving, by a data transceiver coupled to the at least two wires of the shielded cable via a capacitive coupling network, a data signal over the at least two wires of the shielded cable; and injecting, by a power supply coupled to the shielded cable over an inductive coupling network, a feeding current on the at least two wires of the shielded cable for feeding the electric load with electric power, and receiving a return current from the electric load over the conductive shield of the shielded cable.

Such a method for power line transmission provides the same advantages as described above for the power line data transceiver according to the first aspect. The method enables low voltage drop and low losses along the cable and provides improved electromagnetic compatibility. By using the shield of a cable as current return path, power delivery can be boosted by injecting forward current to both or multiple wires of the cable.

According to a fourth aspect, the disclosure relates to a method for receiving or transmitting data over a power line, the power line being adapted to distribute electric power, wherein the power line comprises a shielded cable including at least two wires and a conductive shield shielding the at least two wires, and wherein an electric load is coupled to the power line, the method comprising: receiving or transmitting, by a data transceiver coupled to the at least two wires of the shielded cable via a capacitive coupling network, a data signal over the at least two wires of the shielded cable; and receiving, by a power transceiver coupled to the shielded cable over an inductive coupling network, a feeding current over the at least two wires of the shielded cable for feeding the electric load with electric power, and injecting a return current from the electric load on the conductive shield of the shielded cable.

Such a method for power line transmission provides the same advantages as described above for the power line data transceiver according to the second aspect. The method enables low voltage drop and low losses along the cable and provides improved electromagnetic compatibility. Power delivery can be boosted by receiving forward current from both or multiple wires of the cable. By using the shield of the cable as a current return path, return current can be efficiently injected on the shield of the cable.

BRIEF DESCRIPTION OF THE DRAWINGS

Further, embodiments of the present disclosure will be described with respect to the following figures, in which.

DETAILED DESCRIPTION

In the following detailed description, reference is made to the accompanying drawings, which form a part thereof, and in which is shown by way of illustration exemplary aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The devices described herein may be configured to transmit and/or receive data over power line, e.g. according to the PoDL standard, in particular according to IEEE 802.3bu. Power over data lines (PoDL) is an Ethernet technology, comparable to power over Ethernet (PoE), to connect powered devices in vehicles, in the internet of things (IoT) and in industrial automation via single-pair Ethernet (SPE) to supply voltage. PoDL, which was standardized by the IEEE working group 802.3bu, deals with single-pair Ethernet (SPE) and the interfaces 100Base-T1 and 1000Base-T1. The supply voltage is transmitted via a single unshielded twisted pair (UTP) link segment, at the same time as the data transmission at data rates of 100 Mbit/s and 1 Gbit/s. There is minimal interference between the transmitted data and the supply voltage. This technology is used in the automotive Ethernet, the transport industry and in industrial control.

FIG. 1 shows a schematic diagram of a power over data line (PoDL) system 100 according to the PoDL standard that was defined in IEEE 802.3bu task force, in particular for automotive applications.

This PoDL system 100 enables feeding power 130 to load 102 using a single twisted pair data line cable 101. One wire of the twisted pair cable is used for forward current to the load 102 and the other wire is used for return current. The length of the twisted pair cable 101 is L.

Data is transmitted over the twisted pair cable 101 between two data entities 110, 120.

FIG. 2 shows a schematic diagram of power over data line technology 200 according to the disclosure. The power over data line technology 200 includes a power line data transceiver 200a connected with another power line data transceiver 200b via a power line, which comprises a shielded cable 201 including two or more wires 203, 204 and a conductive shield 202 shielding the at least two wires 203, 204. An electric load 102 is coupled to the power line to receive a feeding current.

Both power line data transceivers 200a, 200b are configured to transmit and/or receive data, while the left hand side power line data transceiver 200a is configured to supply power to the electric load 102 via the power line 201 and the right hand side power line data transceiver 200b is configured to receive power from the left hand side power line data transceiver 200a for feeding the electric load 102.

The power line data transceiver 200a is used for transmitting or receiving data over the power line which is adapted to distribute electric power. The power line data transceiver 200a comprises a data transceiver 210 coupled to the at least two wires 203, 204 of the shielded cable 201 via a capacitive coupling network 211. The data transceiver 210 is configured to transmit or receive a data signal over the at least two wires 203, 204 of the shielded cable 201.

The power line data transceiver 200a comprises a power supply 230 coupled to the shielded cable 201 over an inductive coupling network 231. The power supply 230 is configured to inject a feeding current 232 on the at least two wires 203, 204 of the shielded cable 201 for feeding the electric load 102 with electric power, and to receive a return current 233 from the electric load 102 over the conductive shield 202 of the shielded cable 201.

The inductive coupling network 231 may comprise at least two power inductors 231a, 231b, e.g. as shown in FIG. 3, coupling the power supply 230 with the at least two wires 203, 204 of the shielded cable 201. The at least two power inductors 231a, 231b enable the injection of the feeding current 232 on the at least two wires 203, 204 of the shielded cable 201.

The inductive coupling network 231 may comprise a further power inductor 231c, e.g. as shown in FIG. 3, coupling the power supply 230 with the conductive shield 202 of the shielded cable 201. The further power inductor 231c enables the reception of the return current 233 from the electric load 102 over the conductive shield 202 of the shielded cable 201.

The at least two power inductors 231a, 231b can block the data signal from the power supply 230.

The power supply 230 may comprise for each of the at least two wires 203, 204 of the shielded cable 201 a respective current source 232a, 232b, e.g. as shown in FIG. 3. The feeding current 232 injected on the at least two wires 203, 204 of the shielded cable 201 may correspond to a sum of the respective current sources 232a, 232b, e.g. as shown in FIG. 3.

The power line may comprise a shielded twisted pair cable 201. The power line may for example comprise an Ethernet cable, e.g. an automotive Ethernet cable.

The power line data transceiver 200b is used for receiving or transmitting data over the power line. The power line data transceiver 200b comprises a data transceiver 220 coupled to the at least two wires 203, 204 of the shielded cable 201 via a capacitive coupling network 221. The data transceiver 220 is configured to receive or transmit a data signal over the at least two wires 203, 204 of the shielded cable 201.

The power line data transceiver 200b comprises a power transceiver 240 coupled to the shielded cable 201 over an inductive coupling network 241. The power transceiver 240 is configured to receive a feeding current 242 over the at least two wires 203, 204 of the shielded cable 201 for feeding the electric load 102 with electric power, and to inject a return current 244 from the electric load 102 on the conductive shield 202 of the shielded cable 201.

The inductive coupling network 241 may comprise at least two power inductors 241b, 241c, e.g. as shown in FIG. 3, coupling the power transceiver 240 with the at least two wires 203, 204 of the shielded cable 201. The at least two power inductors 241b, 241c enable the reception of the feeding current 242 from the at least two wires 203, 204 of the shielded cable 201.

The inductive coupling network 241 may comprise a further power inductor 241a coupling the power transceiver 240 with the conductive shield 202 of the shielded cable 201. The further power inductor 241a enables the injection of the return current 244 from the electric load 102 on the conductive shield 202 of the shielded cable 201.

The at least two power inductors 241b, 241c are configured to block the data signal from the power transceiver 240 and the electric load 102.

The feeding current 242 delivered to the electric load 102 may correspond to a sum of currents carried by the respective wires of the at least two wires 203, 204 of the shielded cable 201.

In an example, the shielded cable 201 may comprises a number of m wires; the electric load 102 has an electric resistance of $R_L$; and the power transceiver 240 is configured to receive on each wire a partial feeding current $I_{DC}$, resulting in a feeding of the electric load 102 with an electric power of approximately: $(m\,I_{DC})^2\,R_L$.

FIG. 3 shows a schematic diagram of an exemplary power over data line technology 300 according to the disclosure. The power over data line technology 300 corresponds to a specific implementation of the power over data line technology 200 described above with respect to FIG. 2. The power over data line technology 300 includes a power line data transceiver 200a, as described above with respect to FIG. 2, connected with another power line data transceiver 200b, as described above with respect to FIG. 2, via a power line which comprises a shielded cable 201 including two or more wires 203, 204 and a conductive shield 202 shielding the at least two wires 203, 204, as described above with respect to FIG. 2. An electric load 102 is coupled to the power line to receive a feeding current.

The power line data transceiver 200a is used for transmitting or receiving data over the power line which is adapted to distribute electric power. The power line data transceiver 200a comprises a data transceiver 210 coupled to the at least two wires 203, 204 of the shielded cable 201 via a capacitive coupling network 211, e.g. as described above with respect to FIG. 2. The capacitive coupling network 211 may include one capacitor per wire 203, 204. The data transceiver 210 is configured to transmit or receive a data signal over the at least two wires 203, 204 of the shielded cable 201.

The power line data transceiver 200a comprises a power supply 230 as described above with respect to FIG. 2. The power supply 230 provides a supply voltage $V_S$ (e.g. about 3.3 V in one implementation, but it can be any other value). The power supply 230 is coupled to the shielded cable 201 over an inductive coupling network 231 as described above with respect to FIG. 2. The power supply 230 is configured to inject a feeding current 232 that may comprise the current components 232a, 232b on the at least two wires 203, 204 of the shielded cable 201 for feeding the electric load 102 with electric power, and to receive a return current 233 from the electric load 102 over the conductive shield 202 of the shielded cable 201.

The capacitive coupling network 211 and the inductive coupling network 231 shown in FIG. 3 are just examples. These networks 211, 231 may include more electric and electronic components, for example transistors for controlling the coupling and other components not shown in FIG. 3 for simplicity reasons.

The inductive coupling network comprises at least two power inductors 231a, 231b which couple the power supply voltage $V_S$ 230a with the at least two wires 203, 204 of the shielded cable 201. The at least two power inductors 231a, 231b enable the injection of the feeding current 232 including the current components 232a, 232b on the at least two wires 203, 204 of the shielded cable 201.

The inductive coupling network 231 comprises a further power inductor 231c which couples the power supply 230 with the conductive shield 202 of the shielded cable 201. The further power inductor 231c enables the reception of the return current 233 from the electric load 102 over the conductive shield 202 of the shielded cable 201.

The at least two power inductors 231a, 231b are configured to block the data signal from the power supply 230 and the power supply voltage $V_S$ 230a.

The power supply 230 comprises for each of the at least two wires 203, 204 of the shielded cable 201 a respective current source 232a, 232b that may be driven by the power supply voltage $V_S$ 230a. The feeding current 232, as shown in FIG. 2, injected on the at least two wires 203, 204 of the shielded cable 201 may correspond to a sum of the respective current sources 232a, 232b.

As described above, the power line may comprise or may be a shielded twisted pair cable 201. The power line may for example comprise or may be an Ethernet cable, e.g. an automotive Ethernet cable.

The power line data transceiver 200b comprises a data transceiver 220, as described above with respect to FIG. 2, coupled to the at least two wires 203, 204 of the shielded cable 201 via a capacitive coupling network 221, for example by a respective capacitor per wire 203, 204. The data transceiver 220 is configured to receive or transmit a data signal over the at least two wires 203, 204 of the shielded cable 201.

The power line data transceiver 200b comprises a power transceiver 240, as described above with respect to FIG. 2, coupled to the shielded cable 201 over an inductive coupling network 241, as described above with respect to FIG. 2. The power transceiver 240 is configured to receive a feeding current 243 including the current components 242b, 242c over the at least two wires 203, 204 of the shielded cable 201 for feeding the electric load 102 with electric power, and to inject a return current 244 from the electric load 102 on the conductive shield 202 of the shielded cable 201.

The capacitive coupling network 221 and the inductive coupling network 241 shown in FIG. 3 are just examples. These networks 221, 241 may include more electric and electronic components, for example transistors for controlling the coupling and other components not shown in FIG. 3 for simplicity reasons.

The inductive coupling network 241 comprises at least two power inductors 241b, 241c, i.e. one power inductor 241b, 241c per wire 203, 204 for coupling the power transceiver 240 with the at least two wires 203, 204 of the shielded cable 201. The at least two power inductors 241b, 241c enable the reception of the feeding current 242 from the at least two wires 203, 204 of the shielded cable 201.

The inductive coupling network 241 comprises a further power inductor 241a coupling the power transceiver 240 with the conductive shield 202 of the shielded cable 201. The further power inductor 241a enables the injection of the return current 244 from the electric load 102 on the conductive shield 202 of the shielded cable 201.

The at least two power inductors 241b, 241c can block the data signal from the power transceiver 240 and the electric load 102.

The feeding current 243 delivered to the electric load 102 corresponds to a sum of currents 242b, 242c carried by the respective wires of the at least two wires 203, 204 of the shielded cable 201.

In an example, the shielded cable 201 may comprise a number of m wires; the electric load 102 has an electric resistance of $R_L$; and the power transceiver 240 is configured to receive on each wire a partial feeding current $I_{dc}$, resulting in a feeding of the electric load 102 with an electric power of approximately: $(m\ I_{DC})^2\ R_L$.

For the specific implementation of 2 wires, e.g. shielded twisted pair cable, the total current is $2\ I_{DC}$, the received load power is $(2\ I_{Dc})^2\ R_L = 4\ I_{DC}^2\ R_L$. Thus, power deliver to load 102 can be increased by the factor 2. Having an additional inductor 241a also improves the EMC and there is no need to over drive the wire with DC current resulting in low voltage drop and losses.

These technologies 200, 300 may be applied in automotive applications, e.g. high-speed automotive Ethernet in vehicle for zonal architecture, e.g. using shielded twisted pair (STP) cable as the existing automotive Ethernet standards are based on twisted pair cable. The solutions described in this disclosure provide increased PoDL power delivery and can also be applied in a broad variety of applications such as sensors like camera, radar, LIDAR (light detecting and ranging), display, and others. These sensors may be placed around the vehicle. By using the above described technologies 200, 300 separate cables for power supply can be avoided.

Figure 4:
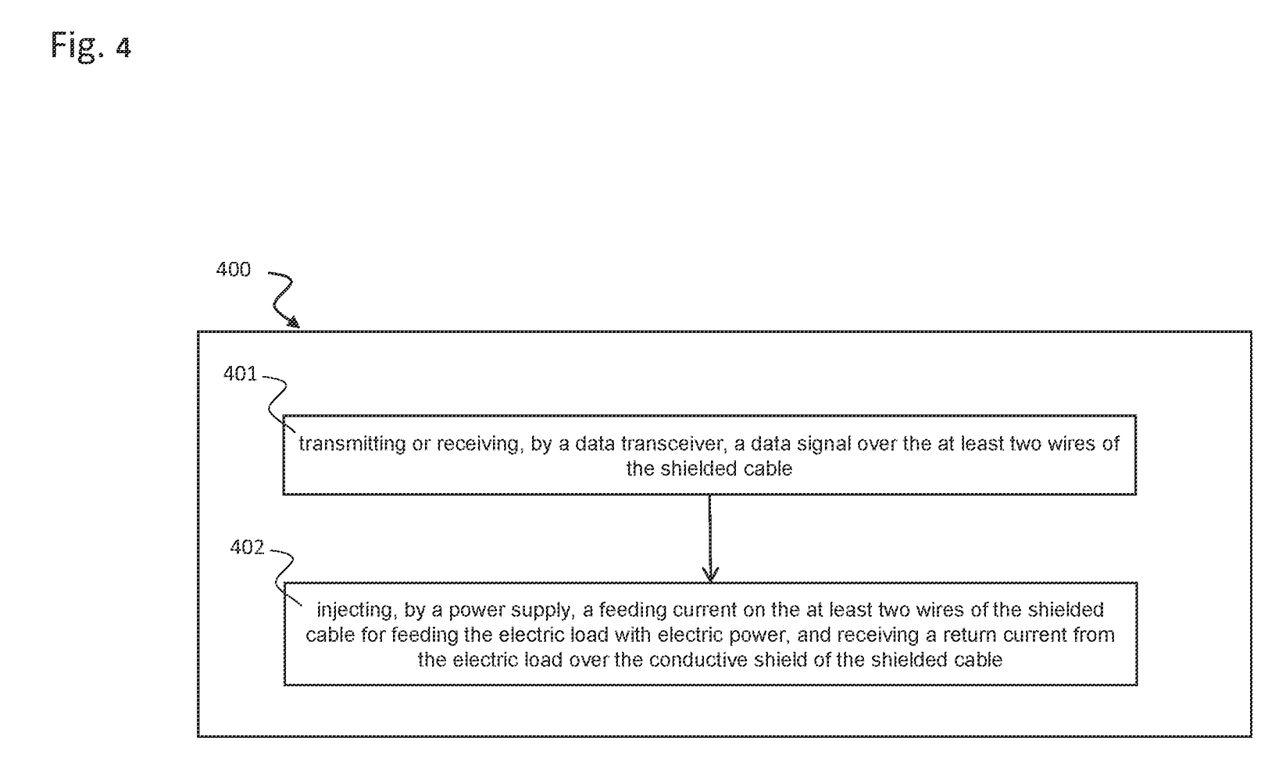
FIG. 4 shows a schematic diagram illustrating a method for transmitting or receiving data over a power line according to the disclosure.

FIG. 4 shows a schematic diagram illustrating a method 400 for transmitting or receiving data over a power line according to the disclosure.

As described above with respect to FIGS. 2 and 3, the power line is adapted to distribute electric power and the power line comprises a shielded cable including at least two wires and a conductive shield shielding the at least two wires. An electric load is coupled to the power line.

The method 400 comprises: transmitting or receiving 401, by a data transceiver coupled to the at least two wires of the shielded cable via a capacitive coupling network, e.g. a data transceiver 200a as described above with respect to FIGS. 2 and 3, a data signal over the at least two wires of the shielded cable.

The method 400 further comprises: injecting 402, by a power supply coupled to the shielded cable over an inductive coupling network, e.g. a power supply 230 as described above with respect to FIG. 2, a feeding current on the at least two wires of the shielded cable for feeding the electric load with electric power, and receiving a return current from the electric load over the conductive shield of the shielded cable.

Such a method for power line transmission provides the same advantages as described above for the power line data transceiver 200a described above with respect to FIGS. 2 and 3. The method enables low voltage drop and low losses along the cable and provides improved electromagnetic compatibility. By using the shield of a cable as current return path, power delivery can be boosted by injecting forward current to both or multiple wires of the cable.

Figure 5:
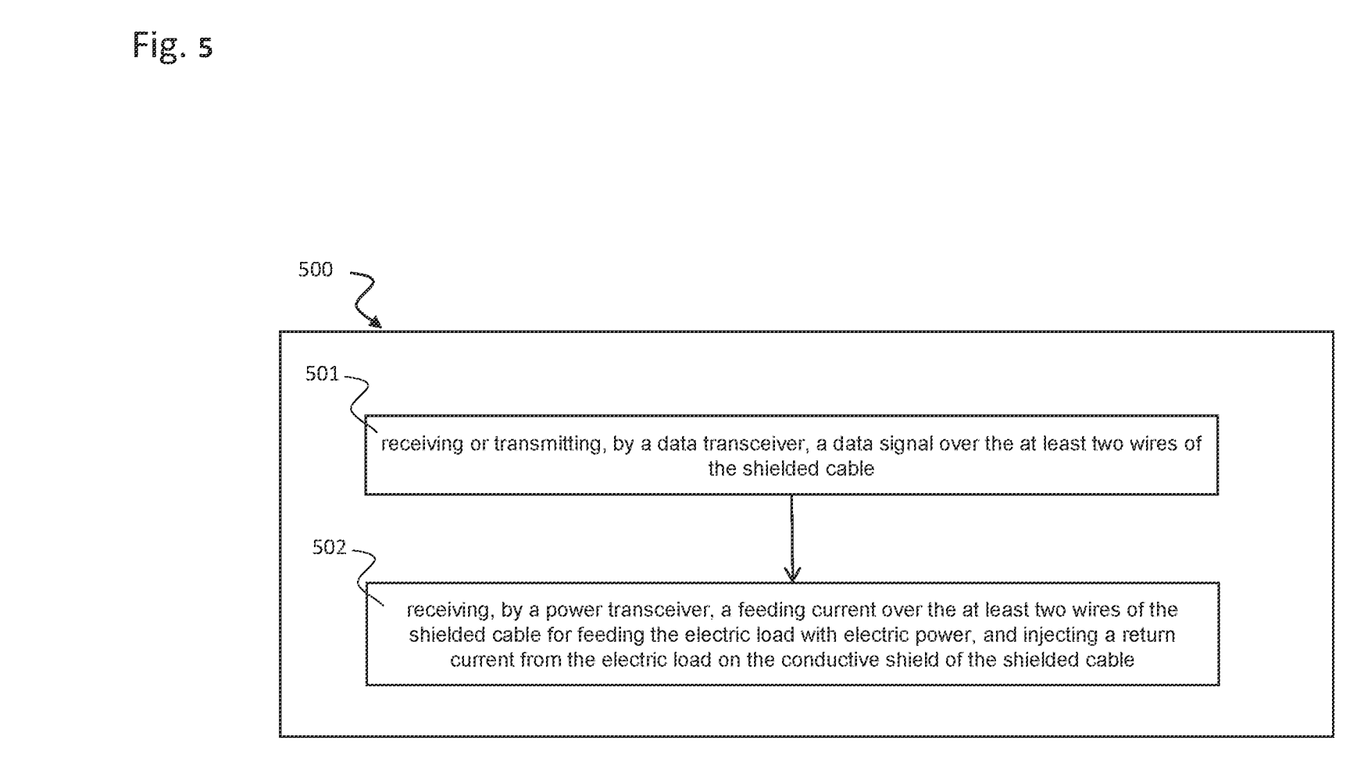
FIG. 5 shows a schematic diagram illustrating a method for receiving or transmitting data over a power line according to the disclosure.

FIG. 5 shows a schematic diagram illustrating a method 500 for receiving or transmitting data over a power line according to the disclosure. As described above with respect to FIGS. 2 and 3, the power line is adapted to distribute electric power and the power line comprises a shielded cable including at least two wires and a conductive shield shielding the at least two wires. An electric load is coupled to the power line.

The method 500 comprises: receiving or transmitting 501, by a data transceiver coupled to the at least two wires of the shielded cable via a capacitive coupling network, e.g. a data transceiver 200b as described above with respect to FIGS. 2 and 3, a data signal over the at least two wires of the shielded cable.

The method 500 further comprises: receiving 502, by a power transceiver coupled to the shielded cable over an inductive coupling network, e.g. a power transceiver 240 as described above with respect to FIG. 2, a feeding current over the at least two wires of the shielded cable for feeding the electric load with electric power, and injecting a return current from the electric load on the conductive shield of the shielded cable.

Such a method 500 for power line transmission provides the same advantages as described above with respect to FIGS. 2 and 3 for the power line data transceiver 200b. The method 500 enables low voltage drop and low losses along the cable and provides improved electromagnetic compatibility. Power delivery can be boosted by receiving forward current from both or multiple wires of the cable. By using the shield of the cable as a current return path, return current can be efficiently injected on the shield of the cable.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the present disclosure may be practiced otherwise than as specifically described herein.

What is claimed is:

1. A power line data transceiver for transmitting or receiving data over a power line, the power line being adapted to distribute electric power, the power line comprising a shielded cable, which comprises at least two wires and a conductive shield shielding the at least two wires, and the power line being configured to be coupled to an electric load, the power line data transceiver comprising:
   a data transceiver coupled to the at least two wires of the shielded cable via a capacitive coupling network, the data transceiver being configured to transmit or receive a data signal over the at least two wires of the shielded cable; and
   a power supply coupled to the shielded cable over an inductive coupling network, wherein the power supply is configured to inject a feeding current on the at least two wires of the shielded cable for feeding the electric load with electric power, and is configured to receive a return current from the electric load over the conductive shield of the shielded cable.

2. The power line data transceiver according to claim 1, wherein the inductive coupling network comprises:
   at least two power inductors coupling the power supply with the at least two wires of the shielded cable, the at least two power inductors enabling the injection of the feeding current on the at least two wires of the shielded cable.

3. The power line data transceiver according to claim 2, wherein the inductive coupling network comprises:
   a further power inductor coupling the power supply with the conductive shield of the shielded cable, the further power inductor enabling the reception of the return current from the electric load over the conductive shield of the shielded cable.

4. The power line data transceiver according to claim 2, wherein the at least two power inductors are configured to block the data signal from the power supply.

5. The power line data transceiver according to claim 1, wherein the power supply comprises; for each of the at least two wires of the shielded cable, a respective current source, and wherein the feeding current injected on the at least two wires of the shielded cable corresponds to a sum of the respective current sources.

6. The power line data transceiver according to claim 1, wherein the power line comprises a shielded twisted pair cable.

7. The power line data transceiver according to claim 1, wherein the power line comprises an Ethernet cable.

8. A power line data transceiver for receiving or transmitting data over a power line, the power line being adapted to distribute electric power, the power line comprising a shielded cable, which comprises at least two wires and a conductive shield shielding the at least two wires, and the power line being configured to be coupled to an electric load, the power line data transceiver comprising:
- a data transceiver coupled to the at least two wires of the shielded cable via a capacitive coupling network, the data transceiver being configured to receive or transmit a data signal over the at least two wires of the shielded cable; and
- a power transceiver coupled to the shielded cable over an inductive coupling network, wherein the power transceiver is configured to receive a feeding current over the at least two wires of the shielded cable for feeding the electric load with electric power, and is configured to inject a return current from the electric load on the conductive shield of the shielded cable.

9. The power line data transceiver according to claim 8, wherein the inductive coupling network comprises:
- at least two power inductors coupling the power transceiver with the at least two wires of the shielded cable, the at least two power inductors enabling the reception of the feeding current from the at least two wires of the shielded cable.

10. The power line data transceiver according to claim 9, wherein the inductive coupling network comprises:
- a further power inductor coupling the power transceiver with the conductive shield of the shielded cable, the further power inductor enabling the injection of the return current from the electric load on the conductive shield of the shielded cable.

11. The power line data transceiver according to claim 9, wherein the at least two power inductors are configured to block the data signal from the power transceiver and the electric load.

12. The power line data transceiver according to claim 8, wherein the feeding current delivered to the electric load corresponds to a sum of currents carried by the respective wires of the at least two wires of the shielded cable.

13. The power line data transceiver according to claim 12, wherein the shielded cable comprises a number m of wires;
wherein the electric load has an electric resistance of RL;
wherein the power transceiver is configured to receive on each wire a partial feeding current IDC, resulting in a feeding of the electric load with an electric power of (m IDC) 2 RL.

14. The power line data transceiver according to claim 8, wherein the data-power line comprises a shielded twisted pair cable.

15. The power line data transceiver according to claim 8, wherein the data power line comprises an Ethernet cable.

* * * * *

UNITED STATES PATENT AND TRADEMARK OFFICE
CERTIFICATE OF CORRECTION

PATENT NO. : 12,289,139 B2
APPLICATION NO. : 18/449504
DATED : April 29, 2025
INVENTOR(S) : Sujan Pandey Page 1 of 1

It is certified that error appears in the above-identified patent and that said Letters Patent is hereby corrected as shown below:

In the Claims

Claim 5: Column 12, Line 60: "wherein the power supply comprises; for each of the at" should read as -- wherein the power supply comprises: for each of the at --.

Claim 14: Column 14, Line 25: "wherein the data-power line comprises a shielded twisted" should read as -- wherein the power line comprises a shielded twisted --.

Claim 15: Column 14, Line 28: "wherein the data power line comprises an Ethernet cable." should read as -- wherein the power line comprises an Ethernet cable. --.

Signed and Sealed this
Fourteenth Day of October, 2025

John A. Squires
*Director of the United States Patent and Trademark Office*